(12) United States Patent
Kim et al.

(10) Patent No.: US 6,519,276 B1
(45) Date of Patent: Feb. 11, 2003

(54) SEQUENTIAL PATH SEARCHING METHOD IN A MOBILE TELECOMMUNICATION SYSTEM HAVING A VARIABLE DATA RATE TRANSMISSION ENVIRONMENT

(75) Inventors: Hee-sub Kim, Seoul (KR); Jae-min Ahn, Seoul (KR)

(73) Assignee: Samsung Electronics, Co., Ltd. (KR)

( * ) Notice: Subject to any disclaimer, the term of this patent is extended or adjusted under 35 U.S.C. 154(b) by 0 days.

(21) Appl. No.: 09/324,332

(22) Filed: Jun. 2, 1999

(30) Foreign Application Priority Data

Jun. 2, 1998 (KR) .............................. 98-20389

(51) Int. Cl.[7] .............................................. H04B 1/707
(52) U.S. Cl. ...................................... 375/148; 370/342
(58) Field of Search ........................ 375/144, 148; 370/209, 335, 342

(56) References Cited

U.S. PATENT DOCUMENTS

| | | | | | |
|---|---|---|---|---|---|
| 5,577,025 A | * | 11/1996 | Skinner et al. | ............. | 370/209 |
| 5,644,591 A | * | 7/1997 | Sutton | ........................ | 375/142 |
| 5,764,687 A | * | 6/1998 | Easton | ........................ | 375/147 |
| 6,108,324 A | * | 8/2000 | Brown et al. | ................ | 370/335 |
| 6,347,080 B2 | * | 2/2002 | Jou et al. | ..................... | 370/310 |

* cited by examiner

Primary Examiner—Young T. Tse
(74) Attorney, Agent, or Firm—Dilworth & Barrese, LLP

(57) ABSTRACT

A sequential path searching method for demodulating a reverse channel in a mobile communication system is disclosed. In case that at least one mobile station maintains connection with a base transceiver station and the system searches an optimal path among multiple of paths which has a great receiving quality, the preferred embodiment of the present invention in a mobile telecommunication system supporting a variable data rate transmission, includes a step of searching multiple paths according to a sequential searching algorithm and avoiding deterioration of demodulation performance on variable data rate transmission.

23 Claims, 2 Drawing Sheets

SEQUENTIAL PATH SEARCHING METHOD IN A MOBILE TELECOMMUNICATION SYSTEM HAVING A VARIABLE DATA RATE TRANSMISSION ENVIRONMENT

BACKGROUND OF THE INVENTION

1. Field of the Invention

The present invention relates generally to cellular communication systems, and more particularly to a method for an improved sequential searcher operation in a mobile telecommunication system supporting a variable data rate transmission.

2. Description of the Related Art

A mobile telecommunication system satisfying the IS-95 standard and standards based on IS-95 uses a searcher and rake receiver which demodulates and uses the signal energy of all paths to find a best receive path among multiple receive paths for demodulation of a reverse channel. Multiple receive paths occur as a consequence of both movement of a mobile station and changes in the wireless telecommunication environment thereby causing continuous changes in the receive-delay time. In such an environment, it is necessary to establish a path having the strongest received signal among the multiple receive paths (i.e., signals), each path having a different delay time. The searcher and rake receiver are used for this purpose.

A prior system which discloses such a method is disclosed in U.S. Pat. No. 5,644,591 entitled "Method and Apparatus for Performing Search acquisition in a CDMA Communication System". The '591 patent calculates the energy level of a received signal in accordance with a pseudorandom noise (PN) sequence, selects a necessary PN sequence and decodes the received signal synchronized to the selected sequence.

A reverse channel of a mobile telecommunication system employing code division multiple access (CDMA) technology transmits walsh symbols at a rate of 4.8 kHz. Six consecutively transmitted walsh symbols make up a single power control group (PCG) with a length of 1.25 millisecond (ms) and 16 consecutive PCGs make up a frame of 20 ms. That is, a gating process divides each 20 ms frame into 16 power control groups.

In a system supporting a 9.6 Kbps rate, one frame corresponds to 192 bits (i.e. full rate) and is composed of 576 code symbols and 96 walsh symbols. Each of the 16 PCG contain 12 bits, composed of 36 code symbols and 6 walsh symbols.

Starting with the first PCG, a searcher searches for a signal at a search position corresponding to a particular delay time within a walsh symbol. The searcher may determine at the first search position whether a signal is received or not by either detecting a signal greater than a predetermined high threshold value when a signal is received, or by detecting a signal lower than a predetermined low threshold value when a signal is not received (i.e. walsh symbol). The searcher records the result of searching including delay time information and moves to the next search position.

The search position represents a delay time and the delay time means a reflection path. That is, the searcher searches for the signal of walsh symbols at a specific delay time. A plurality of search positions, for example, one hundred search positions, may exist within a walsh symbol. The base transceiver station (BTS) stores the received signals in receiving order and divides the signals into walsh symbols in accordance with time. That is, the walsh symbol is a kind of time unit and it has signal.

When each of the six walsh symbols in the PCG have been searched, the searcher calculates an average of the six search results and determines whether a signal is detected or not and then moves to the next PCG. The recorded delay time information is used to control a rake receiver.

While the search operation is capable of determining whether a signal is received or not before searching each of the six walsh symbols in the time required to receive a single PCG group (i.e., 6×4.8 kHz cycles), the searcher in the prior art system does not stop the search operation at the point of determination but performs the search operation unconditionally until all six search iterations have completed, thereby wasting processing time.

A sequential searcher is constructed to avoid wasted processing time. Once the sequential searcher can determine whether a signal is received or not while searching signals at a walsh symbol/rate of 4.8 kHz, the sequential searcher moves to a first search position of the next PCG and continuously performs the search operation. Therefore, the sequential searcher can perform more search operations during the same time period.

In other words, if the sequential searcher detects the existence of a signal at search position 10 of walsh symbol 3 of PCG 0, the sequential searcher starts searching for signals, not from search position 10 of walsh symbol 4, but from search position 11 of walsh symbol 3 of new PCG 1. That is, the search position of the next PCG from the PCG where the existence of a signal is detected.

If no signal is determined to be received, the sequential search repeats the search operation at the same search position a maximum of 6 times. Here, limiting the search to a maximum of six times at the same position is intended to perform the search for a whole PCG. That is, since 6 times 4.8 kHz is equivalent to a PCG, the searcher detects the existence of a signal once each power control group. After searching six times, the search result at the corresponding searcher position is used to control a rake receiver.

Since IS-95 and standards based on the IS-95, however, support variable data rate transmission, the 16 PCGs of each 20 ms frame may or may not carry a signal depending on the data rate.

Turning now to the drawings, FIG. 1 illustrates an exemplary embodiment of a variable data rate transmission of a reverse CDMA channel as defined by IS-95B. As illustrated, since all PCGs are used in the case where a system transmits at 9600 bps, a frame transmits all 16 PCGs. On the other hand, when a system transmits at 4800 bps, the system uses half of PCGs, therefore only 8 PCGs are transmitted. Similarly, 4 PCGs are transmitted in the case of 2400 bps and 2 PCGs are transmitted in case of 1200 bps.

In the case of 4800 bps, the system selects 8 PCGs, while 4 PCGs are selected in the case of 2400 bps, and 2 PCGs are selected in the case of 1200 bps within a frame. The selection of PCGs is pseudo randomized in accordance with a data burst randomizing function. Selective transmission of PCGs appears as noise to those with no knowledge about the randomizing function of a system; by contrast, the transmission is a very orderly selection to those with knowledge of the randomizing function.

If a sequential searcher is directly applied to a system which uses a variable data rate in the aforementioned manner the sequential searcher performs the searching operation over all power control groups (PCGs) without considering whether a corresponding PCG carries a signal and may deteriorate demodulation performance. That is, it is already known by virtue of the variable data rate that certain PCGs will not carry a signal.

A non-sequential searcher, by contrast, detects a signal 6 times unconditionally at a particular position, but the sequential searcher stops searching at a current position and moves to next searcher position if the sequential searcher judges that a signal exists or not during any iteration of the six detection attempts.

That is, since the sequential searcher moves to the next searcher position of the next walsh symbol, if the sequential searcher judges the existence of a signal before the search operation is performed a maximum of 6 times, the starting position for the sequential searcher to start signal detection is not fixed. In such a case, the sequential searcher may perform the searcher operation over both PCGs carrying a signal and PCGs not carrying a signal.

For example, if the 6 iteration search operation starts from a walsh symbol located at the middle of a PCG, a sequential search performs signal searching from the rest of the walsh symbols of the PCG to a particular walsh symbol of the next PCG. Then, if the next PCG does not carry a signal in accordance with a variable data rate transmission, the sequential searcher performs searching over a noise signal and causes a problem in normally detecting a signal. Consequently, if a sequential searcher is applied to a variable data rate transmission environment, walsh symbols belonging to different PCGs are used for searching and a system's demodulation performance is adversely affected.

SUMMARY OF THE INVENTION

It is therefore an object of the present invention to provide an improved sequential searching method to apply a sequential searcher to a system supporting a variable data rate transmission, wherein the sequential searcher operation demodulates a reverse channel in a system using code division multiple access (CDMA) technique.

Other objects and advantages of the present invention will become apparent with reference to the detailed description hereafter and attached drawings.

In accordance with one embodiment of the present invention, there is disclosed a mobile communication system supporting a variable data rate transmission and having a sequential searcher which finds an optimal path among a plurality of paths using predetermined high and low threshold values, and wherein a plurality of paths have different delay times. The method of the present invention includes dividing a time axis in increments of a walsh symbol reception rate; despreading signals received through a plurality of paths by dividing the despread signals into a plurality of power control groups (PCGs) each of which consists of a plurality of walsh symbols; selecting a PCG among the plurality of PCGs and reading a first walsh symbol among a plurality of walsh symbols belonging to the selected PCG; selecting a first search position which is located on the time axis, and calculating a correlation energy value of the first walsh symbol at the first search position, judging whether a signal is detected or not at the first search position by comparing the calculated correlation energy value of the first walsh symbol with the predetermined high threshold and the predetermined low threshold values; reading a second walsh symbol, next to the first search position on the time axis and calculating a correlation energy value of the second walsh symbol at a second search position, next to the first searcher position on time axis; if it was possible to judge whether a path is detected at the first search position, checking whether the first walsh symbol is located at the last position of the PCG on time axis; otherwise if it was impossible to judge whether a path was detected at the first search position, and if the first walsh symbol is not located at the last position of the PCG, reading the second walsh symbol and calculating a correlation energy value of the second walsh symbol at the second search position.

In accordance with another embodiment of the present invention, there is disclosed a mobile communication system supporting a variable data rate transmission and having a plurality of sequential searchers which operate in parallel to find an optimal path among a plurality of paths using predetermined high threshold and low threshold values, and wherein the plurality of paths have different delay times. A sequential path searching method comprises the steps of: despreading signals received through a plurality of paths and dividing the despreaded signals into a plurality of power control groups (PCGs) at each of the sequential searchers, each of which consists of a plurality of walsh symbols, selecting a PCG among a plurality of PCGs and reading a first walsh symbol among a plurality of walsh symbols belonging to the selected PCG, selecting a first searcher position which is located on the time axis, and calculating a correlation energy value of the first walsh symbol at the first searcher position, judging whether a path is detected or not at the first searcher position by comparing the calculated correlation energy value of the first walsh symbol with the predetermined high threshold and the predetermined low threshold values, reading a second walsh symbol, next to the first searcher position on the time axis and confirming whether a second searcher position is used by other sequential searchers, if it is possible to judge whether a path is detected at the first searcher position, wherein the second searcher position is located next to the first searcher position on the time axis divided in accordance with a walsh symbol reception rate, checking whether the first walsh symbol is located at the last position of the PCG on the time axis, if it is impossible to judge whether a path was detected at the first searcher position, reading the second walsh symbol and calculating a correlation energy value of the second walsh symbol at the first searcher position, if the first walsh symbol is not located at the last position of the PCG, reading the second walsh symbol and confirming whether the second searcher position is used by other sequential searchers, if the first walsh symbol is located at the last position of the PCG, calculating a correlation energy value of the second walsh symbol at a third searcher position, if the second searcher position is used by other sequential searchers, wherein the third searcher position is located next to the second searcher position on the time axis and calculating a correlation energy value of the second walsh symbol at the second searcher position, if the second searcher position is not used by other sequential searchers.

DETAILED DESCRIPTION OF THE INVENTION

The present invention relates to a method for operating a sequential searcher during the demodulation of a reverse channel in a code division multiple access (CDMA) system supporting a variable data rate transmission. A searcher according to the method of the present invention moves to a new search position prior to the sixth or final search iteration of a power control group when it is determined that a signal is detected and performs a new search operation. Prior to performing a new search operation, the searcher first checks whether the searcher has reached a boundary of a power control group (PCG). In the case of reaching the boundary of a PCG, the searcher generates the search result using the search results collected to that point in time and to terminates searching at the current search position.

Figure 1:
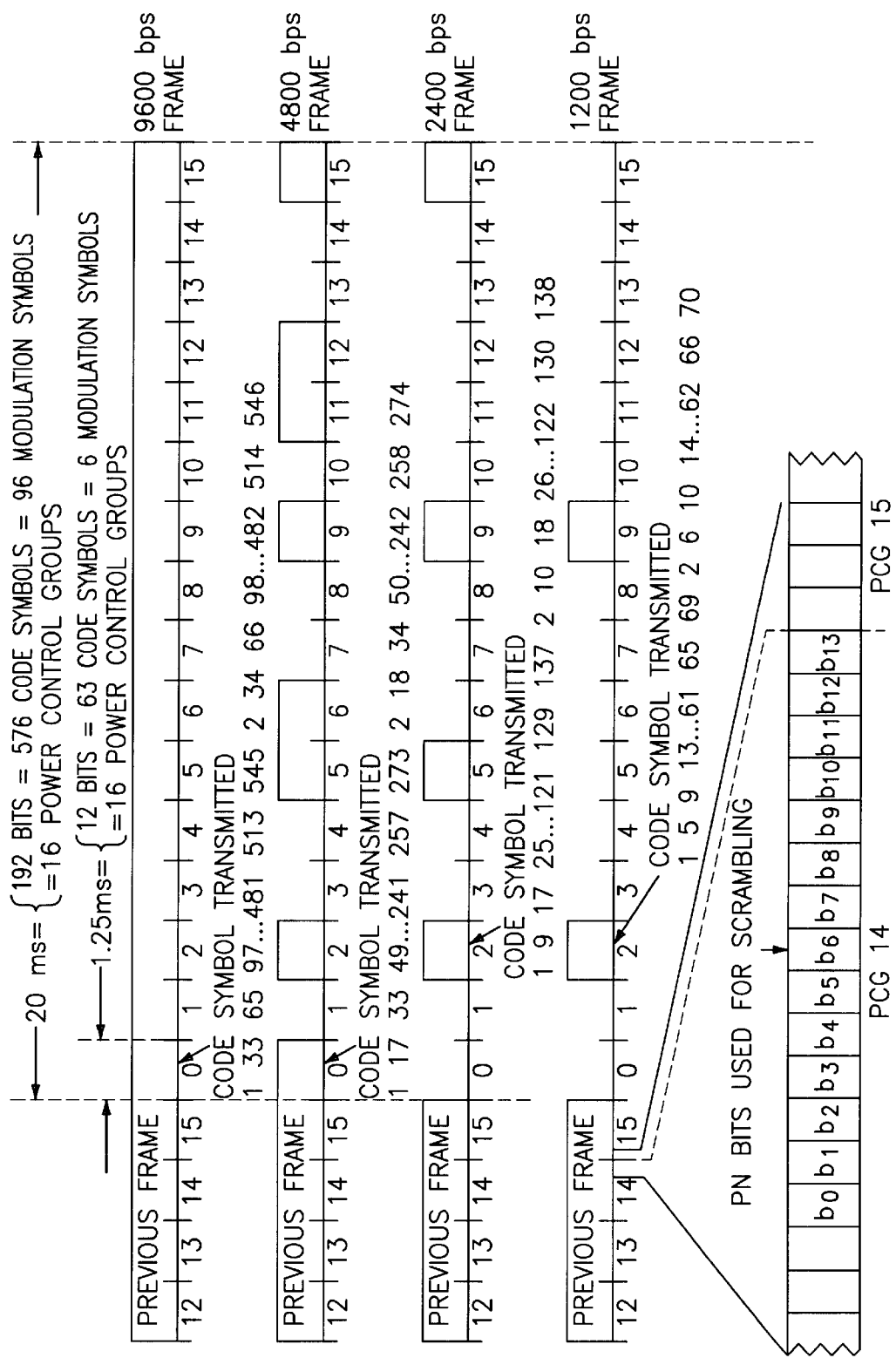
FIG. 1 illustrates an exemplary embodiment of a variable data rate transmission of a reverse CDMA channel presented by IS-95B.
Figure 2:
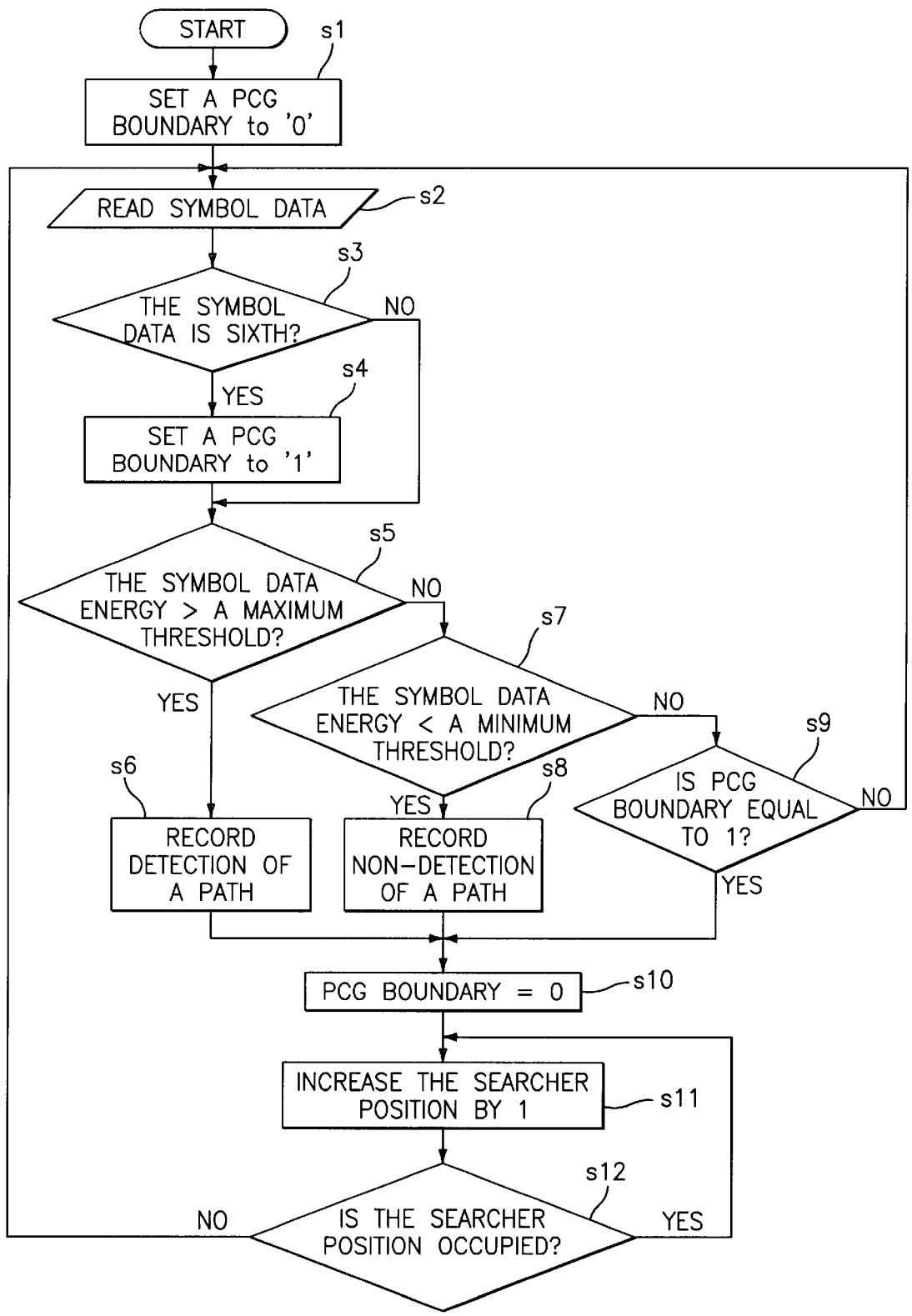
FIG. 2 is a flow chart illustrating a sequential searching method in accordance with an embodiment of the present invention.

FIG. 2 is a flow chart illustrating a path searching method in accordance with a preferred embodiment of the present invention. The operating principle of the present embodiment will be described in greater detail with reference to the attached drawings.

Since a system in accordance with the IS-95 standard and standards based on IS-95A and IS-95B are designed as synchronous systems, the search operation is also implemented in a synchronous manner based on a 4.8 kHz data rate.

When the searcher starts searching, the searcher sets a power control group (PCG) boundary value parameter to 0 (step 1). This zero (0) parameter value indicates that the walsh symbol for which the searcher is currently searching is not at the last position of a power control group PCG, i.e., a boundary position.

The searcher reads the walsh symbol data at the current search position (step 2) and determines whether the walsh symbol data is the sixth symbol data, (i.e., the last symbol of the current PCG (step 3)). If the walsh symbol data symbol being currently evaluated is located at the boundary of the PCG (i.e. last or sixth symbol), the PCG boundary variable is set to 1 (step 4). Otherwise, if the walsh symbol data is not the sixth symbol, the PCG boundary variable should remain zero (0).

The searcher then determines if the energy value of the walsh symbol data at the current search position, is greater than a predetermined high threshold value (step 5). If the energy is greater than the predetermined high threshold value, the searcher records that a signal is detected at the corresponding search position (step 6) and clears the PCG boundary value to 0 (zero) (s10), and increases a search position pointer by 1 to search the next search position (s11).

If the symbol data energy value is not greater than the predetermined high threshold value at step 5, the searcher determines if the symbol data energy value is lower than a predetermined low threshold value (step 7). If the energy value is lower than the predetermined low threshold value, the searcher records that a signal is not detected at the corresponding search position (step 8) and increases a searcher position pointer by 1 (step 11). If it can be judged that a signal is either detected or not detected from the symbol data in steps 5 and 7, the searcher proceeds to search the next position. Otherwise when the signal energy is neither greater than the high threshold value nor lower than the low threshold value, it is impossible to determine whether a signal exists or not. In such a case, the searcher determines whether the current search position is at the boundary of PCG through the PCG boundary parameter value (step 9).

If a PCG boundary parameter value is 1, it is judged that the current walsh symbol under evaluation is located at the boundary of the PCG. In that case, the searcher stops searching the current PCG, re-initializes changes the PCG boundary value to 0 and starts searching a new PCG (step 10). The search position counter is increased by 1 so as to search a new walsh symbol of the new PCG (step 11). In other words, if the currently searched walsh symbol is located at a boundary of the current PCG, i.e., a sixth walsh symbol, the searcher cannot determine whether a signal exists or not for each walsh symbol of the current PCG. The searcher then stops searching over the current PCG, and starts searching the next search position of next walsh symbol of next PCG. Therefore, the searcher does not perform searching across the PCGs.

On the other hand, if the PCG boundary value is not 1, it indicates that the search position is not located at the boundary of the PCG. Thus, the searcher does not change the search position and proceeds to step 2 and reads the next walsh symbol, repeating the foregoing steps. That is, if a searcher is not able to determine whether a signal exists or not and the symbol is not located at a boundary of a PCG, the searcher does not change the original search position and calculates the energy at the same search position of the next walsh symbol.

In the case where a plurality of searchers operate in a BTS, it is necessary to avoid a plurality of searchers searching redundantly at a searcher position. Therefore, when a searcher position pointer is increased, it is first determined whether other searchers are searching at the incremented search position pointer (step 12).

If a different searcher is currently searching there, the search position is incremented again by 1 (step 11) and the examining step is performed at the incremented position (step 12). The process is repeatedly performed, until the searcher moves to a search position which is occupied by other searchers. At this point, the searcher returns to step 2 of reading a walsh symbol data, and repeating the searching operation.

In accordance with the present invention, if a searcher determines that a signal exists or not at a position other than boundary position of a power control group (PCG), the searcher evaluates the energy at the next search position of the next walsh symbol. Otherwise if the searcher cannot determine that a signal exists or not at a particular searcher position, the searcher searches energy at the same searcher position of next walsh symbol.

Furthermore, in accordance with the present invention, if a searcher judges that a signal exists or not at a particular search position of a walsh symbol which is located at a boundary of a PCG, the searcher then searches (i.e., a first walsh symbol of next PCG), while if the searcher does not judge whether a signal exists or not at a particular searcher position, the searcher searches energy at next searcher position of next walsh symbol.

In summary, the method of the present invention is superior to the prior art due to the improved operation of a searcher used for demodulation of a reverse channel having multiple paths in a system using code division multiple access.

Further, the present invention improves the efficiency of a sequential searcher, thereby avoiding unnecessary searching across a power control group to carry signal and power control group not to carry signals and performing a regular signal detection and a secure demodulation in a system supporting a variable data rate transmission. In particular, when searching across a particular power control group comprising six walsh symbols, in the case where the current walsh symbol is not a boundary value (i.e., the sixth walsh symbol), if it is not possible to determine whether or not a signal exists at the particular walsh symbol, the search will continue at the same search position at the next walsh symbol. For example, if the current walsh symbol being analyzed was walsh symbol z, not being able to determine whether a signal exists or not at walsh symbol 2 would require a further determination at walsh symbol 3 at the current search position. It is important to realize that signal detection attempts occur at successive search increments at each walsh symbol. If, however, it is possible to determine whether a signal exists or not at the current search position of the second walsh symbol, in the present example, then the search continues at the next search position of walsh symbol 3. In this case, because a signal was successfully detected, the search position is incremented from a current search position in the ith walsh symbol to the next search position in the (i+1)th walsh symbol.

In the case where the current walsh symbol is a boundary value (i.e., walsh symbol 6) if it is not possible to determine whether the signal exists or not, the search continues at the next search position of walsh symbol (1) one of the next PCG. Otherwise, if it is possible to determine whether the signal exists or not, the search is performed at the next search position of walsh symbol 1 of the next PCG.

While the invention is susceptible to various modification and alternative forms, specific embodiments thereof have been shown by way of example in the drawings and detected description. It should be understood, however, that the present invention is not limited to the particular forms disclosed, but on the contrary, the intention is to cover all modifications, equivalents, and alternative falling within the spirit and scope of the invention as defined by the appended claims.

What is claimed is:

1. A sequential path searching method in a mobile telecommunication system supporting a variable data rate transmission and having a sequential searcher which selects a path from among a plurality of paths using a predetermined high threshold value and a predetermined low threshold value, and wherein the plurality of paths have different delay times, said method comprising the steps of:

(i) despreading along a time axis in units of walsh symbols, signals received through the plurality of paths;

(ii) dividing the despread signals into a plurality of power control groups (PCGs) each of which comprises a plurality of Walsh symbols;

(iii) selecting a PCG from among the plurality of PCGs and reading a first Walsh symbol of the plurality of walsh symbols belonging to the selected PCG;

(iv) selecting a first searcher position that is located on the time axis, and calculating a correlation energy value of the first Walsh symbol at the first searcher position;

(v) determining whether or not a path has been detected at the first searcher position by comparing said calculated correlation energy value of the first Walsh symbol with the predetermined high threshold value and the predetermined low threshold value;

(vi) reading a second Walsh symbol at a second searcher position, next to the first searcher position on the time axis and calculating a correlation energy value of the second Walsh symbol at the second searcher position, if it is possible to determine that the path has been detected or has not been detected at the first searcher position;

(vii) checking whether the first Walsh symbol is located at the last position of the PCG, if it is impossible to determine that the path has been detected or has not been detected at the first searcher position;

(viii) reading the second walsh symbol and calculating the correlation energy value of the second walsh symbol at the first searcher position, if the first walsh symbol is not located at the last position of the PCG; and (ix) reading the second walsh symbol and calculating the correlation energy value of the second walsh symbol at the second searcher position, if the first walsh symbol is located at the last position of the PCG.

2. The method as set forth in claim 1, wherein said steps of calculating a correlation energy value of the walsh symbols include calculating a correlation value of a walsh symbol energy value and a reference signal energy value.

3. The method as set forth in claim 2, wherein said method further comprises the steps of:

recording the first searcher position if it is possible to determine that the path has been detected at the first searcher position; and recording the second searcher position if it is possible to determine that the path has been detected at the second searcher position.

4. The method as set forth in claim 2, wherein said method further comprises the steps of:

recording the first searcher position if it is not possible to determine that the path has been detected at the first searcher position; and recording the second searcher position if it is not possible to determine that the path has been detected at the second searcher position.

5. The method as set forth in claim 2, wherein said step of determining whether a path is detected or not at the first searcher position further comprises the steps of:

comparing the calculated correlation energy value of the first walsh symbol with the predetermined high threshold value, wherein the calculated correlation energy value of the first walsh symbol is searched at the first searcher position;

determining that the path was detected at the first searcher position, if the calculated correlation energy value of the first walsh symbol is greater than the predetermined high threshold value;

comparing the calculated correlation energy value of the first walsh symbol with the predetermined low threshold value, wherein the calculated correlation energy value of the first walsh symbol is searched at the first searcher position;

determining that the path was not detected at the first searcher position, if the calculated correlation energy value of the first walsh symbol is less than the predetermined low threshold value; and determining that it is not possible to determine whether the path was detected if the calculated correlation energy value of the first walsh symbol is equal to or less than the predetermined high threshold value and equal to or greater than the predetermined low threshold value.

6. The method as set forth in claim 5, wherein if it is determined that the path was detected at the first searcher position, said method further comprises a step of recording the first searcher position where the path was detected.

7. The method as set forth in claim 5, wherein if it is determined that the path was not detected at the first searcher position, said method further comprises a step of recording said first searcher position where the path was not detected.

8. The method as set forth in claim 1 wherein a walsh symbol rate is 4.8 kHz.

9. The method as set forth in claim 8 wherein the power control group (PCG) includes 6 walsh symbols.

10. The method as set forth in claim 9, wherein the amount of valid data contained within the power control group is a function of a mobile station and a base transceiver station (BTS).

11. The method as set forth in claim 10, wherein the sequential searcher is applied to the base transceiver station which receives a signal according to a code division multiple access technique from the mobile station.

12. A sequential path searching method for a mobile telecommunication system supporting a variable data rate transmission and having a plurality of sequential searchers which operate in parallel to select a preferably optimum path from a plurality of paths using a predetermined high threshold value and a predetermined low threshold value, and wherein the plurality of paths have different delay times, said method comprising the steps of:

(i) despreading, along a time axis in units of walsh symbols, at a walsh symbol rate, signals received through the plurality of paths;

(ii) dividing the despread signals into a plurality of power control groups (PCGs) at each of the sequential searchers, each despread signal comprised of a plurality of walsh symbols;

(iii) selecting a PCG from among the plurality of PCGs and reading a first walsh symbol of a plurality of walsh symbols belonging to the selected PCG;

(iv) selecting a first searcher position that is located on the time axis, and calculating a correlation energy value of the first walsh symbol at the first searcher position;

(v) determining whether or not an optimum path has been detected at the first searcher position by comparing the calculated correlation energy value of the first walsh symbol with the predetermined high threshold value and the predetermined low threshold value;

(vi) reading a second walsh symbol at a second searcher position, next to the first searcher position on the time axis, and confirming whether the second searcher position is used by other sequential searchers, if it is possible to determine whether said optimum path has been detected or has not been detected at the first searcher position;

(vii) checking whether the first Walsh symbol is located at the last position of the PCG, if it is impossible to determine that said optimum-path has been detected or has not been detected at the first searcher position;

(viii) reading the second Walsh symbol and calculating a correlation energy value of the second Walsh symbol at the first searcher position, if the first walsh symbol is not located at the last position of the PCG;

(ix) reading the second Walsh symbol and confirming whether the second searcher position is used by the other sequential searchers, if the first walsh symbol is located at the last position of the PCG;

(x) calculating the correlation energy value of the second walsh symbol at a third searcher position, if the second searcher position is used by other sequential searchers, wherein the third searcher position is located next to the second searcher position on the time axis; and (xi) calculating the correlation energy value of the second walsh symbol at the second searcher position, if the second searcher position is not used by other sequential searchers.

13. The method as set forth in claim 12, wherein said steps of calculating a correlation energy value of walsh symbols include calculating a correlation value of a walsh symbol energy value and a reference signal energy value.

14. The method as set forth in claim 13, wherein said method further comprises a step of recording the first searcher position if it is impossible to judge whether said optimum path is detected or not.

15. The method as set forth in claim 13, wherein said method further comprises a step of recording the first searcher position if it is possible to judge whether said optimum path is detected or not.

16. The method as set forth in claim 15, wherein said step of judging whether said optimum path is detected at the first searcher position further comprises the steps of:

comparing the calculated correlation energy value of the first walsh symbol with the predetermined high threshold value, wherein the calculated correlation energy value of the first walsh symbol is searched at the first searcher position;

judging that said optimum path was detected at the first searcher position, if the calculated correlation energy value of the first walsh symbol is greater than the predetermined high threshold value for path detection;

comparing the calculated correlation energy value of the first walsh symbol with the predetermined low threshold value, wherein the calculated correlation energy value of the first walsh symbol is searched at the first searcher position;

judging that said optimum path was not detected at the first searcher position, if the calculated correlation energy value of the first walsh symbol is less than the predetermined low threshold value for path detection; and determining that it is impossible to judge whether said optimum path was detected or not if the calculated correlation energy value of the first walsh symbol is equal to or less than the predetermined high threshold value for path detection and equal to or greater than the predetermined low threshold value for path detection.

17. The method as set forth in claim 16, wherein if it is judged that said optimum path was detected at the first searcher position, said method further comprises a step of recording the first searcher position where said optimum path was detected.

18. The method as set forth in claim 16, wherein if it is judged that said optimum path was not detected at the first searcher position, said method further comprises a step of recording the first searcher position where said optimum path was not detected.

19. The method as set forth in claim 18, wherein if it is determined that it is impossible to judge whether said optimum path is detected or not, said method further comprises a step of recording the first searcher position.

20. The method as set forth in claim 13 wherein the walsh symbol rate is 4.8 kHz.

21. The method as set forth in claim 20, wherein the power control group (PCG) includes 6 walsh symbols.

22. The method as set forth in claim 21, wherein the power control group carries valid data or not in accordance with a data rate between a mobile station and a base transceiver station (BTS).

23. The method as set forth in claim 22, wherein each of the sequential searches is applied to the base transceiver station which receives a signal according to a code division multiple access technique from the mobile station.

* * * * *